United States Patent
Dodson et al.

(10) Patent No.: US 7,284,097 B2
(45) Date of Patent: Oct. 16, 2007

(54) MODIFIED-INVALID CACHE STATE TO REDUCE CACHE-TO-CACHE DATA TRANSFER OPERATIONS FOR SPECULATIVELY-ISSUED FULL CACHE LINE WRITES

(75) Inventors: John Steven Dodson, Pflugerville, TX (US); James Stephen Fields, Jr., Austin, TX (US); Guy Lynn Guthrie, Austin, TX (US); Kenneth Lee Wright, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 94 days.

(21) Appl. No.: 10/675,744

(22) Filed: Sep. 30, 2003

(65) Prior Publication Data

US 2005/0071573 A1  Mar. 31, 2005

(51) Int. Cl.
*G06F 12/00* (2006.01)
(52) U.S. Cl. .................. 711/145; 711/146; 711/144
(58) Field of Classification Search ................ 711/145, 711/144, 146, 141, 118, 119
See application file for complete search history.

(56) References Cited

U.S. PATENT DOCUMENTS

| | | | |
|---|---|---|---|
| 5,706,463 A * | 1/1998 | Ebrahim et al. ............ 711/120 |
| 5,943,684 A * | 8/1999 | Arimilli et al. ............. 711/144 |
| 2002/0199063 A1* | 12/2002 | Chaudhry et al. .......... 711/122 |
| 2003/0009638 A1* | 1/2003 | Sharma et al. ............. 711/145 |
| 2003/0023782 A1* | 1/2003 | Arimilli et al. ............... 710/22 |
| 2003/0097529 A1* | 5/2003 | Arimilli et al. ............. 711/141 |
| 2003/0115423 A1* | 6/2003 | Chang ........................ 711/145 |
| 2004/0059877 A1* | 3/2004 | Brown et al. ............... 711/144 |

* cited by examiner

*Primary Examiner*—Matthew Kim
*Assistant Examiner*—Ryan Dare
(74) *Attorney, Agent, or Firm*—Casimer K. Salys; Dillon & Yudell LLP

(57) ABSTRACT

A cache coherency protocol that includes a modified-invalid (Mi) state, which enables execution of a DMA Claim or DClaim operation to assign sole ownership of a cache line to a device that is going to overwrite the entire cache line without cache-to-cache data transfer. The protocol enables completion of speculatively-issued full cache line writes without requiring cache-to-cache transfer of data on the data bus during a preceding DMA Claim or DClaim operation. The modified-invalid (Mi) state assigns sole ownership of the cache line to an I/O device that has speculatively-issued a DMA Write or a processor that has speculatively-issued a DCBZ operation to overwrite the entire cache line, and the Mi state prevents data being sent to the cache line from another cache since the data will most probably be overwritten.

20 Claims, 2 Drawing Sheets

MODIFIED-INVALID CACHE STATE TO REDUCE CACHE-TO-CACHE DATA TRANSFER OPERATIONS FOR SPECULATIVELY-ISSUED FULL CACHE LINE WRITES

BACKGROUND OF THE INVENTION

1. Technical Field

The present invention relates generally to data processing systems and in particular to a method and system for providing cache coherency for speculatively-issued fill cache line writes in a data processing system. Still more particularly, the present invention relates to a cache coherency protocol that enables DMA Claim response without cache-to-cache transfer of data when the requesting device is going to overwrite the entire cache line.

2. Description of the Related Art

A conventional multiprocessor data processing system (referred to hereinafter as an MP), typically comprises a system memory, input/output (I/O) devices, a plurality of processing elements that each include a processor, and one or more levels of cache memory. The combination of the caches and system memory provide a memory hierarchy that is typically consistent.

The caches are commonly used to temporarily store values that might be repeatedly accessed by a processor or other device (e.g., I/O), in order to speed up processing by avoiding the longer step of loading the values from memory. Each cache has an associated cache controller that manages the transfer of data and instructions between the processor core and the cache memory and coordinates coherency operations for that cache.

In addition to processor caches, other types of caches are often implemented to provide temporary storage to a device that frequently accesses data that is stored in or retrieved from memory. For example, an I/O cache may be utilized to stage data transmissions to and from the I/O devices. The I/O cache enables buffering of data being transmitted to the I/O device or being sent to memory from the I/O device.

With multiple caches within the memory hierarchy, a coherent structure is required for valid execution results in the MP. This coherent structure provides a single view of the contents of memory to all of the processors and other memory access devices, e.g., I/O devices. Coherent memory hierarchy is maintained through the use of a coherency protocol, such as the MESI protocol. FIG. 4 illustrates the possible state transitions when supporting cache coherency operations with the MESI protocol. As illustrated, with the MESI protocol, a cache line may be tagged with one of four states, "M" (Modified), "E" (Exclusive), "S" (Shared) or "I" (Invalid).

In the MESI protocol, an indication of a coherency state is stored in association with each coherency granule (e.g., cache line or sector) of at least all upper level (cache) memories. Each coherency granule can have one of the four MESI states, which is indicated by bits in the cache directory's SRAM. The modified state indicates that a coherency granule is valid only in the cache storing the modified coherency granule and that the value of the modified coherency granule has not been written to system memory. When a coherency granule is indicated as exclusive, the coherency granule is resident in, of all caches at that level of the memory hierarchy, only the cache having the coherency granule in the exclusive state. The data in the exclusive state is consistent with system memory, however, If a coherency granule is marked as shared in a cache directory, the coherency granule is resident in the associated cache and in at least one other cache at the same level of the memory hierarchy, all of the copies of the coherency granule being consistent with system memory. Finally, the invalid state indicates that the data and address tag associated with a coherency granule are both invalid.

The state to which each coherency granule (e.g., cache line) is set is dependent upon both a previous state of the cache line and the type of memory access sought by a requesting processor. Accordingly, maintaining memory coherency in the multiprocessor data processing system requires that the processors communicate messages across the system bus indicating their intention to read or write memory locations. For example, when a processor desires to write data to a memory location, the processor must first inform all other processing elements of its intention to write data to the memory location and receive permission from all other processing elements to carry out the write operation. The permission messages received by the requesting processor indicate that all other cached copies of the contents of the memory location have been invalidated, thereby guaranteeing that the other processors will not access stale local data.

Typical processor operations that affect the coherency state of the cache lines include reads, stores, DClaims, caste out (CO), read-with-intent-to-modify (RWITM), and data cache block set to zero (DCBZ) operations. I/O devices may also affect the coherency state of the cache lines, and these operations include direct memory access (DMA) reads, DMA writes, DMA Claim, CO, and RWITM. Most of the processor operations (except the DCBZ) require access to only a portion of a cache line at a time. For example, with a 128B cache line, a 64B store operation may be completed by the processor and affects only the first or second 64B of data in the cache line. However, the I/O device operations all require access to the entire cache line. A DMA Write, for example, requires access to the entire 128B cache line and overwrites the entire 128B cache line. DCBZ is one processor operation that also requires access to the full cache line and overwrites the entire cache line.

DMA writes require the writing device be given ownership of the cache line so that no other device can access the line until the write is completed. To provide the writing device with sole (i.e., exclusive ownership given to that device) ownership of the cache line, a first operation, the DMA Claim operation is issued on the system bus prior to the DMA Write being issued. The DMA Claim is an address operation that reserves a particular cache line for receiving the data of the DMA write. When the DMA Claim is snooped by the other devices the most coherent copy of the data within the caches is immediately placed on the data bus and sent to the cache that now has sole ownership of the cache line (i.e., the cache of the device completing the DMA Claim).

Similar to the DMA write by the I/O device, a DCBZ operation may be issued by a processor that intends to overwrite the content of an entire cache line. The processor is provided sole ownership of the cache line via a DClaim operation, which also forces the most coherent copy of the data to be sent to the processor cache. The DClaim operation is thus similar in functionality to the DMA Claim operation.

Because of the latency involved in providing data on the data bus following a DMA Claim and/or a DClaim operation, current systems typically send these operations out on the address bus ahead of time to reserve the cache line and trigger the movement of most coherent data to the device's cache from another cache, if required. However, the data sent to the device cache is typically not needed since the DMA Writes and DCBZ operations overwrite the content of the cache line. Nonetheless, with the MESI protocol, maintaining coherency requires this sequence of address operation followed by data operation to be followed. While the data is being transferred, no other device, is allowed access to the cache line and the device writing to the line has to wait until the data arrives before it can complete the write operation. Thus, significant latency is built into this process. Additionally, placing the data on the data bus for cache-to-cache transfer utilizes a substantial amount of bus resources that could be allocated to other processes.

The present invention recognizes that it would be desirable to provide a method and system by which coherency latency for speculative cache line writes is hidden or substantially reduced. A cache coherency protocol that includes a coherency state to account for speculative, full cache line writes to a cache would be a welcomed improvement. These and other features are provided by the invention described herein.

SUMMARY OF THE INVENTION

Disclosed is a method and system for enabling completion of a speculatively-issued full cache line write without requiring cache-to-cache transfer of data on the data bus during a preceding DMA Claim or DClaim operation. The invention provides a cache coherency protocol that includes a modified-invalid (Mi) state, which assigns sole ownership of a cache line to a device that is going to overwrite the entire cache line without requiring the cache line to first receive modified data from another cache.

The data processing system comprises a processor and associated processor cache(s), an input/output (I/O) device and associated I/O cache, and system memory. Also, the data processing system comprises an I/O channel controller (CC) that controls access to the I/O cache. When the I/O device issues a speculative DMA Write to an I/O cache line, a corresponding DMA Claim is issued on the system bus for that cache line. The operation is snooped by other devices, which provides the I/O cache with sole ownership of the cache line. The I/O CC changes the coherency state of the cache line within the I/O cache to Mi. No data is sent to the I/O cache from the other caches. Rather, if modified data exists in such other caches, that data is caste out to memory, and the cache line in such other caches is tagged with the I state. While the line in the I/O cache is in the Mi state, all received requests for access to the cache line are retried.

Notably, the preferred implementation does not allow a DMA write (or associated DMA Claim) to be speculatively issued when the I/O cache has a copy of the cache line in the M state. The DMA Write of the I/O cache line by the I/O device overwrites the data without requiring the I/O cache to first establish sole ownership of the line. Because the line is already in the M state, no changes in coherency states of other caches are required and no early caste out of data to memory is performed. However, in an alternate embodiment, the I/O CC still issues a DMA Claim for sole ownership of the line in the I/O cache, and modified data in the cache line of the I/O cache is caste out to memory when the DMA claim is issued. This implementation provides sole ownership to the I/O cache and prevents another device from changing the cache line while waiting for the DMA write to be issued. In either implementation, when the DMA Write executes and writes data to the I/O cache line, the coherency state of the I/O cache line is changed from Mi to M state. If the DMA Write does not occur, the line changes state from Mi to I state.

A similarly coherency response is provided for speculatively issued data cache block to zero (DCBZ) operations of a processor. The coherency state of the line within the processor cache changes to Mi and then to M or I, depending on how the speculative nature of the operation is resolved.

In one embodiment, the Mi state is provided as a part of an extended MESI protocol. The Mi state indicates that the device (I/O or processor) has ownership of the cache line within the respective device cache but that the data within the entire cache line is expected to be overwritten by the device. Similarly addressed cache lines associated with other devices are assigned different coherency states (e.g., I). When the device eventually overwrites the cache line, the Mi state transitions to M. If no overwrite of the cache line occurs, the Mi state transitions to I, and subsequent requests for the data in the cache line are sourced from memory, which contains a copy of valid cache line data from the previous caste out operation.

The latency of waiting until data from another cache is transferred into the cache line before completing the overwrite of the cache line is substantially eliminated because the cache-to-cache data transfer does not occur. Thus, the latency of coherency operations for full cache line writes in the data processing system is also substantially reduced, and cache-to-cache data bus bandwidth is conserved for other data operations.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DETAILED DESCRIPTION OF AN ILLUSTRATIVE EMBODIMENT

Figure 1:
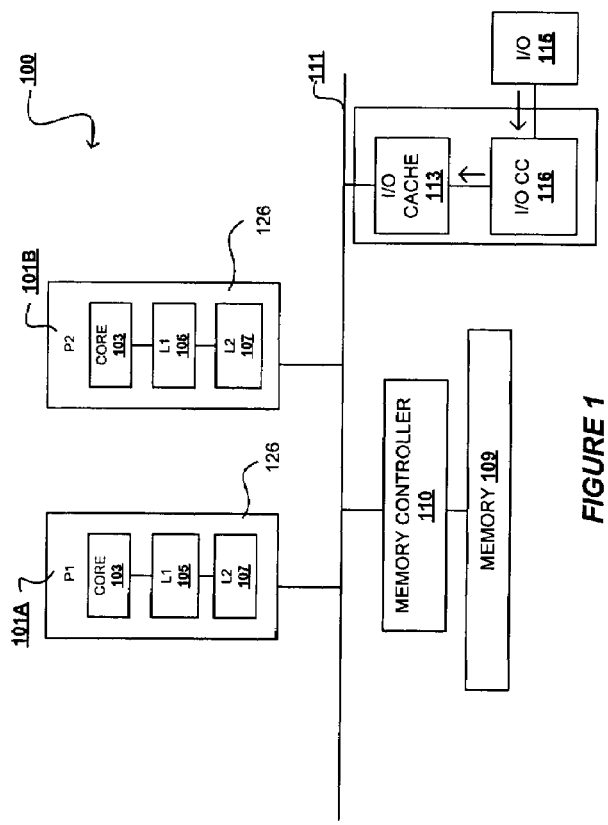
FIG. 1 depicts an illustrative embodiment of a multiprocessor data processing system with processors, I/O devices, and a memory hierarchy in which the features of the present invention may advantageously be utilized.

With reference now the figures and in particular to FIG. 1, there is illustrated a multi-processor data processing system (MP) 100. MP 100 comprises several major components including processing units 101, namely P1 101A and P2 101B, memory 109, and I/O device(s) 115. Both memory 109 and I/O device(s) 115 have associated controllers, memory controller 110 and I/O channel controller (CC) 116.

I/O CC 116 controls the read, write and other memory access operations of I/O device(s) 115 which address lines in I/O cache, L4 cache 113, and memory 109.

Processing units 101 are connected to memory 109 and I/O devices 115 via interconnect 111, and each component communicates with the other components and other peripheral devices via interconnect 111. According to the invention, interconnect 111 is a bifurcated bus having a first bus for routing data (data bus) and a separate bus for routing address transactions and other operations (address bus). The respective sizes of address bus and data buses may differ, with the data bus having a substantially larger bandwidth than the address bus. Processing units 101 may also communicate with memory via direct memory access (DMA) channels (not shown).

P1 101A and P2 101B each include processor core (CPU) 103, onboard L1 cache 105 and L2 cache 107. Each cache comprises a cache controller, cache array and cache directory. According to the invention, each cache is designed to complete coherency operations according to the extended-MESI protocol described herein.

The present invention is described with reference to MP 100 and components of MP 100 illustrated by FIG. 1, but the present invention may be applied to different configurations of data processing systems that are not necessarily conventional, i.e., configurations that may include new hardware components not shown in FIG. 1, or have a novel interconnect architecture for existing components. Also, MP 100 may have many additional components, such as serial and parallel ports for connection to, e.g., modems or printers. MP 100 may also comprise more than two processing units.

Also, as will become apparent, the present invention may be utilized at any cache level in a multi-level cache architecture (L1, L2, L3, etc.), although the cache architecture need not be a multi-level one. Furthermore, the present invention may be used in different types of MPs including a symmetric multi-processor (SMP). The invention may also be implemented within a non-uniform memory access (NUMA) system, wherein the system memory (RAM) is divided among two or more memory arrays (having separate memory controllers connected to the system bus) and allocated among the processing units. Therefore, those skilled in the art will appreciate that the present invention is not limited to the generalized system shown in FIG. 1.

Figure 2:
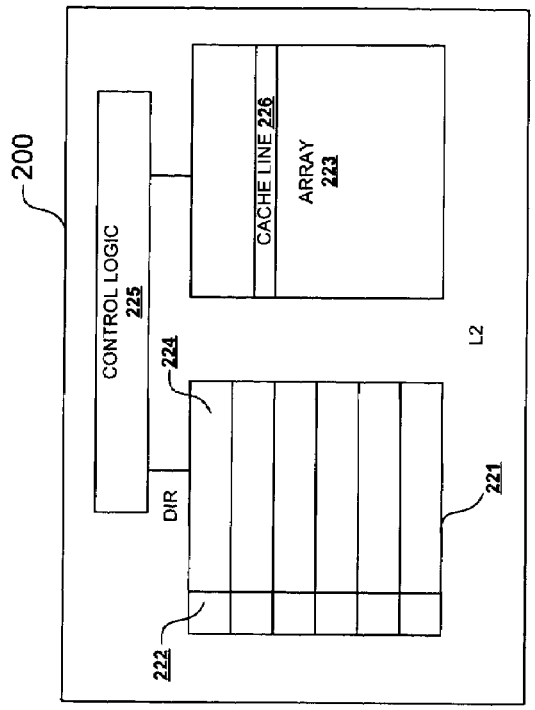
FIG. 2 is a block diagram of a cache controller/directory with coherency bits for tracking coherency states of cache lines, including the Mi coherency state, according to one embodiment of the present invention.

The various features of the invention are carried out at a cache line level within caches in the memory hierarchy. FIG. 2 provides an illustrative cache 200 utilized during the various data transmissions and data coherency features described herein. Cache 200 includes cache controller 225, directory 221 and data array 223. Data array 223 comprises cache lines in which blocks of data are stored. An exemplary cache line 226 is illustrated within data array 223. Directory 221 is preferably an SRAM that comprises a plurality of address registers 224, which store the addresses of corresponding data in the data array 223. Directory 221 further comprises associated coherency registers 222 with the current coherency state for each cache line. Updates to the entries in the directory 221 are complete via a directory update logic within the cache controller 225.

The improved method and system of the present invention relates generally to handling of speculatively-issued full cache line write operations and specifically to a novel coherency state to enable efficient handling of such operations. The invention provides a coherency protocol that supports a speculative request by an I/O device or processor for sole access to a cache line when the device speculatively plans to overwrite the entire cache line. For simplicity, the device (I/O or processor) that is issuing the write request/operation is referred to as a master. Also, although actual operations on the I/O cache are controlled by the I/O CC, these operations are referred to as I/O device operations since the operations typically originate form the I/O device. Finally, a speculatively-issued write operation is understood to be one that is issued speculatively but may be later resolved as not actually required to be completed. When a speculatively-issued write operation is resolved as not being speculative (i.e., the write operation is allowed to proceed), that operation is referred to herein as a valid write operation. Otherwise, the operation is referred to as an invalid write operation, which is discarded.

Speculatively-Issued DMA Writes and DCBZs with DMA Claims

DMA Writes to memory addresses typically occur in sequential order and results in a corresponding sequence of DMA Claims being issued on the system bus to claim sole ownership of the sequentially-addressed memory address spaces. In order to reduce the latency involved when a first DMA write is completed before a subsequent DMA write is allowed to complete, the sequence of DMA writes are issued speculatively (i.e., before being resolved as actually required by the device). The data of the DMA writes are first staged to the I/O cache and thus the I/O cache must be tagged to indicate the ownership of the line. In conventional practice, this process includes (1) first pushing the cache line data to memory, and then (2) giving the I/O CC control of the line (in the M/E state). However, the data currently in the cache is scheduled to be overwritten by the pending DMA write operation.

When the DMA Writes begin, the I/O CC claims lines before the write in order to speed up the processing of the sequence of writes. Thus, when the operation reaches the particular line, the path is already cleared for immediate transmission of the data in the cache line. For example, assume a series of cache lines CL0 through CL6, which are the objects of DMA Claim operations, some of which (CL5 and CL6) are based on speculative DMA writes. When the DMA Claim operation begins, the DMA Claim address operations are issued to secure sole ownership of CL0 through CL6 and clear the path for the DMA write operations. Thus, even CL5 and CL6 are cleared for the full cache line write before the DMA Write for cache line 5 and 6 are resolved as valid operations. The DMA Claim is therefore only a speculative DMA Claim when it is initially issued.

Notably, however, in the preferred embodiment, no speculative operation is issued if the I/O cache already contains the cache line in the M state. Rather, the I/O CC waits to see if an I/O device update is issued for the cache line and allows the update of the modified line to complete. The I/O CC thus checks the I/O cache for a copy of the cache line and suspends speculative issuance of the DMA write when the write operation targets a modified cache line of the I/O cache. The DMA Write is allowed to overwrite the data without requiring the I/O device be given sole ownership of the line. Because the line is in the M state, no change in coherency state is required and no early caste out of data to memory is performed.

DMA Claim Response with No Cache-To-Cache Data Tenure

The invention overcomes the latency inherent with current data responses to DMA Claim and DClaim operations, by recognizing that no data should be placed on the bus from one cache to another because the writing device is most probably going to overwrite the cache line. When the DMA Claim (or DClaim) operation is snooped, the snooper recognizes that sole ownership of the cache line is to be given to the writing device, and the snooper responds to the operation by invalidating any copy of the cache line in its caches if the cache line is in the S or E state. If the snooper has the cache line in the M state, the snooper first castes out the line to memory before invalidating the cache line.

Data existing in the M state in any one of the caches are caste out to memory rather than being sent to the I/O cache and the cache line all other caches, other than the I/O cache are tagged with an I state. This eliminates the cache-to-cache data transfer that occurs with other coherency operations. Notably, caste-out to memory may also occur from the I/O cache if the I/O cache has the cache line tagged with an M state before the DMA claim is issued. However, as explained above, the preferred implementation does not allow DMA writes to be speculatively issued when the I/O cache contains the cache line in the M state. Thus, while data may be cast out to memory, no data is sent from the snooper's cache to the cache of the writing device. The DMA Claim (and D Claim) operations are completed without any data traffic on the cache-to-cache data bus.

Tracking Cache Coherency Data-Less Cache-to-Cache Operations

Providing the "data-less" cache response to a speculative DMA Write (or DCBZ) requires some mechanism way to maintain coherency among the caches during the transfer of sole ownership to the master device's cache. Additionally, the mechanism should also be able to release the sole ownership of the cache line based on the resolution of the speculative DMA write. The invention thus introduces a new coherency state, which indicates that the I/O device's cache has sole ownership of the cache line but the data is currently invalid, subject to the resolution of the speculated DMA Write. From a cache perspective, the new coherency state further indicates that the I/O device's cache has acquired sole ownership of the line without receiving cache line data from another cache.

In the illustrative embodiment, the MESI protocol is expanded to include a fifth coherency state, which is only assigned when a master device issues a speculative operation for a complete overwrite of the cache line in the device's cache. The new coherency state is referred to herein as the Modified-invalid (Mi) coherency state. Although referred to as Modified-invalid, the Mi state is not a transient state. Rather, the Mi state is a unique state that is recorded within the coherency registers by the directory update logic. A cache line in the master device's cache is tagged with the Mi state following a speculatively issued write operation that initiates a DMA Claim (or D Claim) in the cache hierarchy to secure sole ownership of the cache line for the master device.

The data within a cache line tagged with the Mi state is considered invalid, pending the write operation, since the master device is expected to overwrite the entire cache line. As explained above, this situation may occur, for example, when an I/O CC issues a speculative DMA Claim for a cache line in the I/O cache or when the processor issues a speculative DCBZ. The present invention is equally applicable to similar operations, which may be implemented to modify data in a cache line after gaining sole access to the cache line, and references to specific processor operations should not be construed as limiting on the invention.

The Mi state is assigned to a cache line when the master device requests sole ownership of the cache line before the data is actually available to be written to the cache line by the master device (i.e., a speculative write). For example, referring to FIG. 1, I/O device operates as the master device and issues a DMA Claim to obtain ownership of a cache line of the I/O cache. The I/O device is given sole ownership of the cache line, although current data for this line is not in the cache. The current data is not sent to the I/O cache, however, because the I/O device may later overwrite all of the cache line. Having sole ownership allows the I/O device to complete a full cache line write/store before any other device can gain access to the cache line. When the data is later placed in the cache line by the I/O device, the Mi state changes to M. The Mi state thus also indicates that the full cache line store data is pending and that no transfer of current data from another cache was required. If the write operation is resolved as an invalid operation, the coherency state of the line transitions to I.

The sole ownership with intent to over-write is signaled to the system by the coherency state of the cache line changing to Mi in the master device's cache. Also, with the Mi-MESI coherency protocol, described below, the coherency state of the master device's cache line changes at the time the address operation is issued on the bus. Thus, data bandwidth is conserved by not sending data to the master device's cache when the write operation indicates that the data is going to be overwritten. Also, the latency of waiting for completion of a data transfer phase before the DMA Write or DCBZ operation can be completed is substantially eliminated.

Mi-MESI Coherency Protocal

Figure 4:
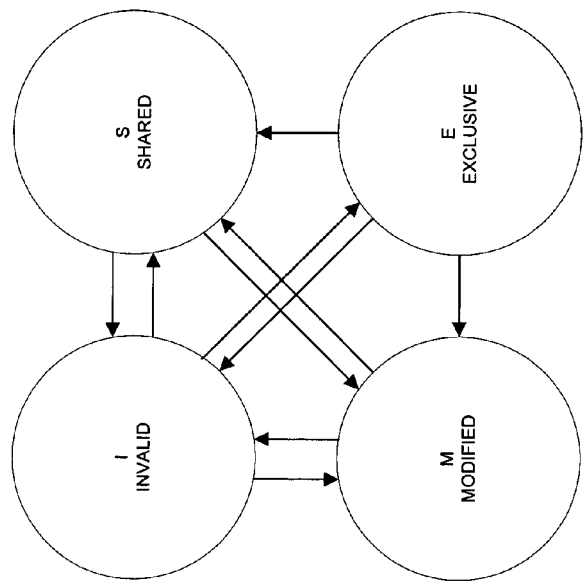
FIG. 4 is a state diagram depicting transition states of a prior art cache coherency protocol (MESI).
Figure 3A:
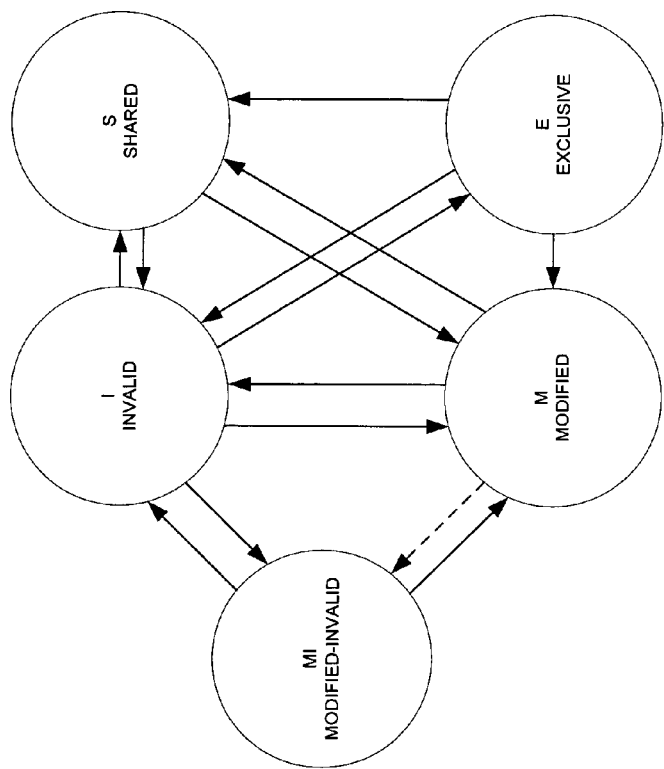
FIG. 3 is a state diagram depicting an illustrative embodiment of the extended-MESI cache coherency protocol including an Mi coherency state, according to the present invention.

With reference now to FIG. 3, there is depicted a state transition diagram of one embodiment of a cache coherency protocol according to the present invention. In addition to the coherency states of the traditional MESI (Modified, Exclusive, Shared and Invalid) protocol of FIG. 4, the Mi-MESI coherency protocol of the invention comprises an additional Mi state that is linked to the other states of the MESI protocol, and the Mi state transitions to and from specific ones of the other states. The actual transitions to and from the Mi state result from a series of operations, which are more clearly illustrated in Table 1 below. With the exception of the final state of the line, all other operations prior to the change to the Mi state remain the same.

The triggering operations and traditional state changes between the other pairs (not M and I) of coherency states remain relatively unchanged. As illustrated in FIG. 3, the Mi-MESI protocol allows a transition from an Invalid state to a Modified-Invalid state, from a Modified-Invalid state to a Modified state, and from a Modified-Invalid state to an Invalid state. The dashed lines from M to Mi indicate a possible transition following a caste out of data from the master device's cache to memory. This embodiment is not preferred as it involves issuing a DMA Claim that is not required and forcing a caste out of data from the very cache line that is being updated. The preferred implementation simply allows the modified cache line to remain in that state and be updated by the master device without speculation and coherency state changes. The transitions among the Mi-MESI protocol may further be understood with reference to Table 1, which illustrates the address operations and resulting transitions among cache coherency states for a particular cache line that is shared among caches of processors, P0 and P1, and I/O device:

TABLE 1

| Device | P0 cache | P1 cache | I/O cache | Data/Bus Transactions |
|---|---|---|---|---|
| A | | | | |
| Initial States | I | E/S/I | I | |
| I/O DMA Claim | I | I | Mi | No data transactions |
| P0 Read | S/E | I | I | Data from memory |
| B | | | | |
| Initial States | I | M | I | |
| I/O DMA Claim | I | I | Mi | Caste out to memory |
| DMA Write | I | I | M | No bus transaction |

Table 2 below summarizes the operations that trigger the transitions among the various coherency states of the Mi-MESI protocol. Transitions involving Mi state are bolded.

TABLE II

| State Transition | Causes | Notes |
|---|---|---|
| I → E | processor read with null response | "processor read" denotes a read request by the associated (i.e., local) processor |
| I → Mi | Spec. DCBZ or DMA Claim before data available | |
| I → S | processor read with any response except null; | |
| I → M | processor "read with intent to modify" (RWITM) | |
| E → S | snooped read | source intervention data |
| E → M | processor RWITM | |
| Mi → I | snooped read with null response | source intervention data |
| Mi → M | DCBZ commit; DMA Write commit | |
| S → M | processor RWITM | |
| M → S | snooped read | source data if modified intervention is supported |

When the master device with a cache line in the Mi state receives a request from another device (e.g., a processor) seeking to access the cache line, the other device is retried until the data is received in the cache line of the master device's cache. The receipt of the data is indicated by the cache line's coherency state being changed from Mi to M. If the data is never written into the master device's cache, i.e., the speculative write operation was determined to be incorrectly speculated, the state of the cache line in the master device's cache is changed to I and the retrieved processor's request for data is sent to memory.

The present invention can also be combined with other coherency protocols. Those skilled in the art will appreciate that more complex forms of coherency protocol are possible, such as a hybrid version using additional states with different functional characteristics. It is understood however, the presentation of specific operations and/or transition states is not meant to be limiting on the invention as other operations causing transitions among states, such as from E to M may be possible and therefore falls within the scope of the invention. The invention however focuses on the transitions to and from the Mi state.

Notably, although the Mi state provides the master device's cache with exclusivity (i.e., no other cache has access to the cache line), the Mi state is functionally very different from the Exclusive (E) state. Notable differences between the two states include: (1) While data tagged with the E (exclusive) state is received directly from memory, a cache line tagged with the Mi state does not receive data from another source (either from memory or another cache); (2) Also, transition to the E state is only possible when all the caches are previously in the I state (i.e., no cache has a valid copy of the cache line). Transition to the Mi state may occur from at least one other coherency state other than I (e.g., M state, in a second, non-preferred implementation). Also, any cache (including the master device's cache) may have the cache line data in a valid state prior to the transition of the master device's cache to the Mi state; (3) The E state does not prevent another device from accessing the cache line and sharing or modifying the data. The sole ownership given to the cache when the cache line is in the Mi state prevents any access to the cache line by any other device other than the master device; and (4) The E state is changed whenever another device issues a write or read operation targeted at the cache line. Coherency state changes from Mi to I or M are only in response to operations by the master device and not in response to snooped operations of another device. The coherency change automatically occurs following resolution by the master device of whether the write operation was correctly speculated.

With the Mi state of the Mi-MESI protocol, the cache controller signals the "ownership" of the cache line as soon as the address operation targeting an entire cache line is accepted and acknowledged on the system bus, i.e., without any cache-to-cache transfer of data. The cache-to-cache data transfer phase is eliminated, and the device is able to immediately complete the write of the entire cache line. Implementation of the invention thus enables a further decoupling of the data bus from the address bus. The decoupling is particularly useful for systems with differing amounts of bandwidth. Bandwidth on the data bus is saved by the master device not receiving data that is not needed, and the latency of completing these cache response operations is substantially eliminated.

Although the invention has been described with reference to specific embodiments, this description should not be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. In a data processing system having a coherent memory hierarchy that includes a memory and a plurality of caches each assigned to particular ones of a plurality of devices that generate cache access operations, a method of maintaining cache coherency comprising:

generating a first-type address operation for a speculatively-issued cache line overwrite operation;

speculatively issuing the first-type address operation for sole ownership of the cache line;

when a first device issues the first-type address operation, which operation requests sole ownership of a cache line and indicates that said first device intends to overwrite the cache line in a first cache, changing a coherency state of the cache line within said first cache to a first coherency state, which indicates that the first device has sole ownership of the cache line AND may not overwrite the cache line, wherein said first-type address operation further causes a second device that has a most coherent copy of the cache line to not issue the most coherent copy of the cache line on the system bus;

in response to snooping said first-type address operation, changing a coherency state of the cache line in a second cache associated with a snooping device to a second state without sending data from said cache line in the second cache to the first cache, wherein a default response to a snoop of a different-type address operation requesting the cache line automatically triggers a return of the cache line from the second cache when the second cache has the most coherent copy of the cache line;

wherein sole ownership of said cache line is provided to said first device without data being sourced to said first cache from another cache; and determining whether said cache line overwrite operation was correctly speculated, wherein said first coherency state is changed to another coherency state depending on whether said cache line overwrite operation was correctly speculated, and when said operation was correctly speculated:

determining that said cache line overwrite operation was correctly speculated;

initiating a write of said cache line with data provided by said first device; and changing said first state to a third state indicating that a most coherent copy of said data exists within the cache line of the first cache.

2. The method of claim 1, wherein, when said first device subsequently initiates a write of said cache line, said method further comprises changing said first state to a third state indicating that a most coherent copy of said data exists within the cache line of the first cache.

3. The method of claim 1, further comprising:

determining when said cache line overwrite operation was not correctly speculated;

changing the coherency state of the cache line in the first cache from said first coherency state to an invalid state; and subsequently sourcing requests for said cache line from memory.

4. The method of claim 2, further comprising:

snooping requests for access to said cache line at said first cache;

when the cache line in said first cache is in the third coherency state and said first device has completed writing data to said first cache, sourcing the data from the first cache to the second cache;

when the cache line in said first cache is in the invalid coherency state, sourcing the data from memory.

5. The method of claim 1, further comprising:

snooping requests for access to said cache line at said first cache; and when the cache line in the first cache is still in the first coherency state, retrying all snooped requests, wherein all subsequent requests snooped while said cache line is in the first coherency state is retried until the coherency state changes.

6. The method of claim 1, further comprising:

snooping a read request for said cache line at said first cache; and when the read request receives a null response and said cache line in the first cache is still in the first coherency state:

sourcing data from memory in response to the read request and placing the data in a cache line of a next cache from which the read request was generated; and changing said first coherency state to an invalid state in said first cache.

7. The method of claim 1, wherein said first device is an I/O device and said first cache is an I/O cache controlled by an I/O controller, said method further comprising:

issuing the first-type address operation as a direct memory access (DMA) claim from the I/O device in response to a speculative DMA write.

8. The method of claim 1, wherein said first device is a processor and said first cache is a processor cache controlled by a cache controller, said method further comprising:

issuing the first-type address operation in response to a data cache block zero (DCBZ) operation from the processor.

9. In a data processing system having a memory hierarchy that includes a memory and a plurality of caches interconnected by a system bus and each accessible by particular ones of a plurality of devices, a caching mechanism that provides address coherency operations for cache line writes by a first device, said caching mechanism comprising:

a first cache of the first device having a cache line that is a less coherent copy than a corresponding cache line in a second cache of a second device;

a coherency tracking mechanism that supports at least a first coherency state, a second coherency state and a third coherency state, wherein:

said first coherency state indicates that said first cache has sole ownership of the cache line AND data within said first cache line may not be overwritten by said first device, wherein said first cache is provided sole ownership of the cache line pending an outcome of a speculative write operation of the first device that may update the cache line;

said second coherency state indicates that the data is invalid; and said third coherency state indicates that the data is a most coherent copy of said data;

means for generating said first-type address operation for sole ownership of a cache line in response to a speculatively-issued cache line overwrite operation processed by the first device;

means for the first device to issue a first-type address operation requesting sole access to said cache line and indicating that said first device intends to overwrite the cache line in the first cache, wherein said first-type address operation further causes a second device that has a most coherent copy of the cache line to not issue the most coherent copy of the cache line on the system bus, said means providing means for speculatively issuing the first-type address operation for sole ownership of the cache line by the first device;

means for changing a coherency state of said cache line within said first cache to said first coherency state when a response is received on said system bus indicating that sole ownership has been granted to said first cache; and means for determining whether said cache line overwrite operation was correctly speculated, wherein said first coherency state is changed to another coherency state depending on whether said cache line overwrite operation was correctly speculated.

10. The caching mechanism of claim 9, further comprising:

means for snooping the particular address operation; and means, when the first-type address operation is snooped while the cache line is in said third coherency state within a snooping device's cache and the snooping device determines the first-type address operation is for access that does not overwrite the entire cache line, for:

issuing data from the snooping device's cache line on the data bus when said access is granted to said first device; and changing a coherency state of the snooping device's cache line to a fourth coherency state that indicates that the first device's cache line has data in a coherent state that is as coherent or more coherent than said snooping device's cache line; and means, when a snooped request of the first-type address operation is received while the snooping device's cache line is in said third coherency state and the snooped operation is for sole ownership of the cache line that is to be completely overwritten by the first device, for changing a coherency state of the snooping device's cache line to said second state, and withholding any transfer of data to the first device's cache line, wherein data is not transferred on the system bus from a next cache containing a most coherent copy of the cache line data to the first cache of the first device when said first device indicates it intends to overwriting the cache line and wherein a default response to a snoop of a different-type address operation requesting the cache line automatically triggers a return of the cache line from the second cache to the first cache when the second cache has the most coherent copy of the cache line.

11. The caching mechanism of claim 10, further comprising:

means for overwriting the data within said first device's cache line with data from the first device, wherein said overwriting is only initiated after sole ownership has been granted and said first cache line is in said first coherency state; and subsequently changing the coherency state of the first device's cache line to the third state indicating that a most coherent copy of said data exists within the first device's cache line.

12. The caching mechanism of claim 11, further comprising:

means for snooping requests for access to said cache line from a requesting device;

means, when the cache line is in the third coherency state and said first device has completed writing data to said cache line, for sourcing the data from the cache line to the requesting device; and means, when the cache line is in the second coherency state, for indicating that said data should be sourced from memory.

13. The caching mechanism of claim 9, further comprising:

means for snooping requests for access to said cache line from a requesting device; and means, when the first device's cache line is still in the first coherency state, for retrying all snooped requests, wherein all subsequent requests snooped while said first device's cache line is in the first coherency state are retried until the coherency state changes to a different coherency state.

14. The caching mechanism of claim 11, further comprising:

means for snooping a read request for said cache line; and means, when the read request receives a null response and said cache line is still in the first coherency state, for:
    indicating that data for the cache line should be sourced from memory; and
    changing said first coherency state to the second coherency state.

15. The caching mechanism of claim 9, wherein when said cache line overwrite operation was not correctly speculated, said mechanism further comprises:

means for changing the coherency state of the first device's cache line in the first cache from said first coherency state to the second coherency state; and means for subsequently sourcing requests for said cache line from memory.

16. The caching mechanism of claim 9, wherein when said cache line overwrite operation was correctly speculated, said mechanism further comprises:

means for initiating a write of said first device's cache line with data provided by said first device; and means for changing the coherency state of the first device's cache line from said first coherency state to the third coherency state.

17. The caching mechanism of claim 9, wherein said first device is an I/O device and said caching mechanism includes an I/O cache controlled by an I/O controller, and further comprises:

means for issuing the address operation as a direct memory access (DMA) claim from the I/O device in response to a speculative DMA write.

18. The caching mechanism of claim 9 wherein said first device is a processor and said caching mechanism includes a processor cache controlled by a cache controller, and further comprises means for issuing the address operation from the processor in response to a data cache block zero (DCBZ) operation.

19. A data processing system, comprising:

an interconnect including an address bus and a data bus;

a plurality of devices interconnected via coupled to said interconnect;

a plurality of caches that are each associated with a device among said plurality of devices, wherein a first cache associated with a first device includes:

a first cache line having a coherency indicator and coherency mechanism that supports at least a first coherency state, a second coherency state and a third coherency state, wherein:

said first coherency state indicates that data within said first cache line is solely owned by the first cache AND may not be overwritten by said first device, wherein said first cache is provided sole ownership of the cache line pending an outcome of a speculative write operation by the first device which may update the cache line;

said second coherency state indicates that the data is invalid; and said third coherency state indicates that the data is a most coherent copy of the data across the plurality of caches;

means for said first device to issue a special address operation that requests sole access to said cache line and indicates that the first device intends to overwrite the cache line in the first cache; and means for changing a coherency state of said first device's cache line to said first coherency state when a response is received indicating that sole ownership has been granted to said first device.

20. The data processing system of claim 19, further comprising:

means for a snooping device to snoop the special address operation; and means, when the snooping device snoops the special address operation while the snooping device's cache line is in said third coherency state and determines that the special address operation is for access that does not overwrite the entire cache line, for:

issuing data from the snooping device's cache line on the data bus when said access is granted to said first device; and changing a coherency state of the snooping device's cache line to a fourth coherency state that indicates that the first device's cache line has data in a coherent state that is as coherent or more coherent than said snooping device's cache line;

means, when the special address operation is snooped while the snooping device's cache line is in said third coherency state and the snooped operation is for sole ownership of the cache line that is to be completely overwritten by the first device, for changing a coherency state of the snooping device's cache line to said second state, and withholding any transfer of data to the first device's cache line; and means, when the snooped operation is received, for changing the coherency state of the cache line in the first cache to the first coherency state when sole access is granted to the first device's cache, wherein data is not transferred on the system bus from a next cache containing a most coherent copy of the cache line data to the first cache of the first device when said first device indicates it intends to overwriting the cache line and wherein a default response to a snoop of a different-type address operation requesting the cache line automatically triggers a return of the cache line from the second cache to the first cache when the second cache has the most coherent copy of the cache line.

* * * * *